(12) United States Patent
Kompa et al.

(10) Patent No.: US 10,935,097 B2
(45) Date of Patent: Mar. 2, 2021

(54) CANTED COIL SPRING WITH LONGITUDINAL COMPONENT WITHIN AND RELATED METHODS

(71) Applicant: Bal Seal Engineering, LLC, Foothill Ranch, CA (US)

(72) Inventors: Joshua Kompa, Foothill Ranch, CA (US); Farshid Dilmaghanian, Rancho Santa Margarita, CA (US); Daniel Poon, Westminster, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 0 days.

(21) Appl. No.: 15/870,633

(22) Filed: Jan. 12, 2018

(65) Prior Publication Data

US 2018/0135714 A1 May 17, 2018

Related U.S. Application Data

(63) Continuation of application No. 14/211,598, filed on Mar. 14, 2014, now Pat. No. 9,909,636.

(Continued)

(51) Int. Cl.
*F16F 1/06* (2006.01)
*F16F 1/04* (2006.01)
(Continued)

(52) U.S. Cl.
CPC .............. *F16F 1/045* (2013.01); *B23P 11/00* (2013.01); *F16B 21/186* (2013.01); *F16F 1/065* (2013.01);
(Continued)

(58) Field of Classification Search
CPC .... F16F 1/045; F16F 1/065; F16F 1/06; F16F 1/13; F16F 1/34; F16F 1/426;
(Continued)

(56) References Cited

U.S. PATENT DOCUMENTS

| | | |
|---|---|---|
| 2,638,896 A | 5/1953 | Clark |
| 3,174,500 A | 3/1965 | Johnson et al. |

(Continued)

FOREIGN PATENT DOCUMENTS

| | | |
|---|---|---|
| DE | 19807663 | 9/1999 |
| EP | 2497527 | 9/2012 |

(Continued)

OTHER PUBLICATIONS

International Search Report and Written Opinion on corresponding PCT application (PCT/US2014/027686) from International Searching Authority (KR) dated Aug. 26, 2014.

(Continued)

*Primary Examiner* — Nicholas J Lane
(74) *Attorney, Agent, or Firm* — Klein, O'Neill & Singh, LLP

(57) ABSTRACT

A coil spring for use in a cavity, such as in a groove of a pin, a housing, or both. The cavity can also be part of a seal assembly. The coil spring can have a longitudinal component positioned within the plurality of interconnected coils that runs along the spring coil axis in order to increase rigidity of the coil spring. The longitudinal component applies a load against the coil spring and/or provides restriction against the coil spring taking a shape or size different than that of the coil spring retaining groove.

19 Claims, 9 Drawing Sheets

Related U.S. Application Data

(60) Provisional application No. 61/785,023, filed on Mar. 14, 2013.

(51) Int. Cl.
| | |
|---|---|
| *B23P 11/00* | (2006.01) |
| *F16F 1/13* | (2006.01) |
| *F16F 1/42* | (2006.01) |
| *F16F 1/34* | (2006.01) |
| *F16B 21/18* | (2006.01) |

(52) U.S. Cl.
CPC ............... *F16F 1/13* (2013.01); *F16F 1/34* (2013.01); *F16F 1/426* (2013.01); *F16F 2236/025* (2013.01); *Y10T 29/4987* (2015.01); *Y10T 403/604* (2015.01)

(58) Field of Classification Search
CPC ........... F16F 2236/025; H01R 13/6277; H01R 4/4863; H01R 13/639; H01R 13/6272
USPC ........ 267/168, 169; 439/349, 345, 372, 668, 439/669
See application file for complete search history.

(56) References Cited

U.S. PATENT DOCUMENTS

| | | |
|---|---|---|
| 4,227,601 A | 10/1980 | Pilatowicz |
| 4,655,462 A | 4/1987 | Balsells |
| 4,678,210 A | 7/1987 | Balsells |
| 4,824,400 A * | 4/1989 | Spinner .................. H01P 1/045 333/254 |
| 4,826,144 A | 5/1989 | Balsells |
| 4,830,344 A | 5/1989 | Balsells |
| 4,872,710 A | 10/1989 | Konecny et al. |
| 4,876,781 A | 10/1989 | Balsells |
| 4,893,795 A | 1/1990 | Balsells |
| 4,907,788 A | 3/1990 | Balsells |
| 4,915,366 A | 4/1990 | Balsells |
| 4,934,666 A | 6/1990 | Balsells |
| 4,961,253 A | 10/1990 | Balsells |
| 4,964,204 A | 10/1990 | Balsells |
| 4,974,821 A | 12/1990 | Balsells |
| 5,108,078 A | 4/1992 | Balsells |
| 5,139,243 A | 8/1992 | Balsells |
| 5,139,276 A | 8/1992 | Balsells |
| 5,149,642 A | 9/1992 | Mazur et al. |
| 5,160,122 A | 11/1992 | Balsells |
| 5,161,806 A | 11/1992 | Balsells |
| 5,203,849 A | 4/1993 | Balsells |
| 5,239,737 A | 8/1993 | Balsells |
| 5,411,348 A | 5/1995 | Balsells |
| 5,474,309 A * | 12/1995 | Balsells ............... H05K 9/0016 174/351 |
| 5,503,375 A | 4/1996 | Balsells |
| 5,545,842 A | 8/1996 | Balsells |
| 5,570,719 A | 11/1996 | Richards et al. |
| 5,709,371 A | 1/1998 | Balsells |
| 5,791,638 A | 8/1998 | Balsells |
| 6,249,946 B1 * | 6/2001 | Greenhill ............... B25B 27/20 29/229 |
| 6,672,565 B2 | 1/2004 | Russell |
| 6,835,084 B2 | 12/2004 | Poon et al. |
| 6,860,485 B2 | 3/2005 | Masuyama et al. |
| 7,055,812 B2 | 6/2006 | Balsells |
| 7,538,289 B2 | 5/2009 | Carroll |
| 7,722,415 B2 | 5/2010 | Changsrivong |
| 7,914,315 B2 | 3/2011 | Kuhn et al. |
| 7,914,351 B2 | 3/2011 | Balsells et al. |
| 7,985,105 B2 | 7/2011 | Balsells |
| 8,052,459 B2 | 11/2011 | Smith et al. |
| 8,096,842 B2 | 1/2012 | Poon et al. |
| 8,308,167 B2 | 11/2012 | Balsells et al. |
| 8,336,864 B2 | 12/2012 | Noh |
| 8,382,532 B2 | 2/2013 | Sjostedt et al. |
| 8,428,724 B2 | 4/2013 | Sage |
| 8,491,346 B2 | 7/2013 | Sjostedt et al. |
| 8,561,274 B2 | 10/2013 | Balsells |
| 8,590,867 B2 | 11/2013 | Leon |
| 9,004,805 B2 | 4/2015 | Changsrivong et al. |
| 9,267,526 B2 | 2/2016 | Balsells |
| 9,273,742 B2 | 3/2016 | Balsells et al. |
| 9,284,970 B2 | 3/2016 | Dilmaghanian et al. |
| 9,312,630 B2 | 4/2016 | Huang |
| 9,482,255 B2 | 11/2016 | Changsrivong et al. |
| 9,500,211 B2 | 11/2016 | Changsrivong |
| 9,518,626 B2 | 12/2016 | Balsells et al. |
| 9,534,625 B2 | 1/2017 | Balsells |
| 9,677,587 B2 | 6/2017 | Changsrivong et al. |
| 2002/0122690 A1 | 9/2002 | Poon et al. |
| 2003/0096526 A1 | 5/2003 | Balsells |
| 2004/0119245 A1 | 6/2004 | Thomas et al. |
| 2006/0228166 A1 | 10/2006 | Balsells |
| 2010/0029145 A1 | 2/2010 | Balsells et al. |
| 2010/0102518 A1 | 4/2010 | Gao et al. |
| 2010/0279558 A1 | 11/2010 | Leon et al. |
| 2010/0289198 A1 * | 11/2010 | Balsells ................. B21F 35/00 267/151 |
| 2011/0068523 A1 | 3/2011 | Noh |
| 2011/0124245 A1 * | 5/2011 | Fujita ..................... H01R 13/17 439/840 |
| 2011/0311015 A1 | 12/2011 | Ziaei et al. |
| 2013/0149031 A1 | 6/2013 | Changsrivong et al. |
| 2014/0130329 A1 | 5/2014 | Changsrivong et al. |
| 2014/0162487 A1 | 6/2014 | Frederick et al. |
| 2014/0259617 A1 | 9/2014 | Kompa et al. |
| 2014/0378008 A1 | 12/2014 | Young et al. |
| 2015/0240900 A1 | 8/2015 | Poon et al. |
| 2015/0316115 A1 | 11/2015 | Carter |
| 2016/0076568 A1 | 3/2016 | Dilmaghanian et al. |
| 2016/0204557 A1 | 7/2016 | Kim |
| 2016/0265574 A1 | 9/2016 | Ghasiri |
| 2016/0359252 A1 * | 12/2016 | Duong ................ E21B 33/0385 |
| 2017/0352984 A1 | 12/2017 | Changsrivong et al. |
| 2017/0373425 A1 * | 12/2017 | Rust ....................... H01R 39/08 |

FOREIGN PATENT DOCUMENTS

| | | | |
|---|---|---|---|
| EP | 3105411 A1 | 12/2016 | |
| GB | 2127626 A * | 4/1984 | ......... H01R 13/6583 |
| GB | 2194298 | 3/1988 | |
| WO | WO 03067713 | 8/2003 | |
| WO | WO2015123407 A1 | 8/2015 | |

OTHER PUBLICATIONS

Extended European Search Report from European Patent Office on related application (EP14768641.4) dated Mar. 28, 2017.
Non-Final Office Action on related (U.S. Appl. No. 14/211,598) dated Mar. 8, 2016.
Final Office Action on related (U.S. Appl. No. 14/211,598) dated Sep. 1, 2016.
Extended European Search Report from European Patent Office on related application (EP19176030.5) dated Oct. 31, 2019.
Bal Seal Canted Coil Springs, Circular and Spring Lengths for Radial and Axial Loading, Calatog No. DM3Mm, Rev. A, Jul. 17, 1992, Bal Seal Engineering Company, Inc., Santa Ana, CA, U.S.A., (24 pages).
Latching and Holding With Bal Seal Canted-Coil Circular Welding Springs, Product News #164D, Nov. 23, 1991, Bal Seal Engineering Company, Inc., Santa Ana, California, U.S.A., (6 pages).

* cited by examiner

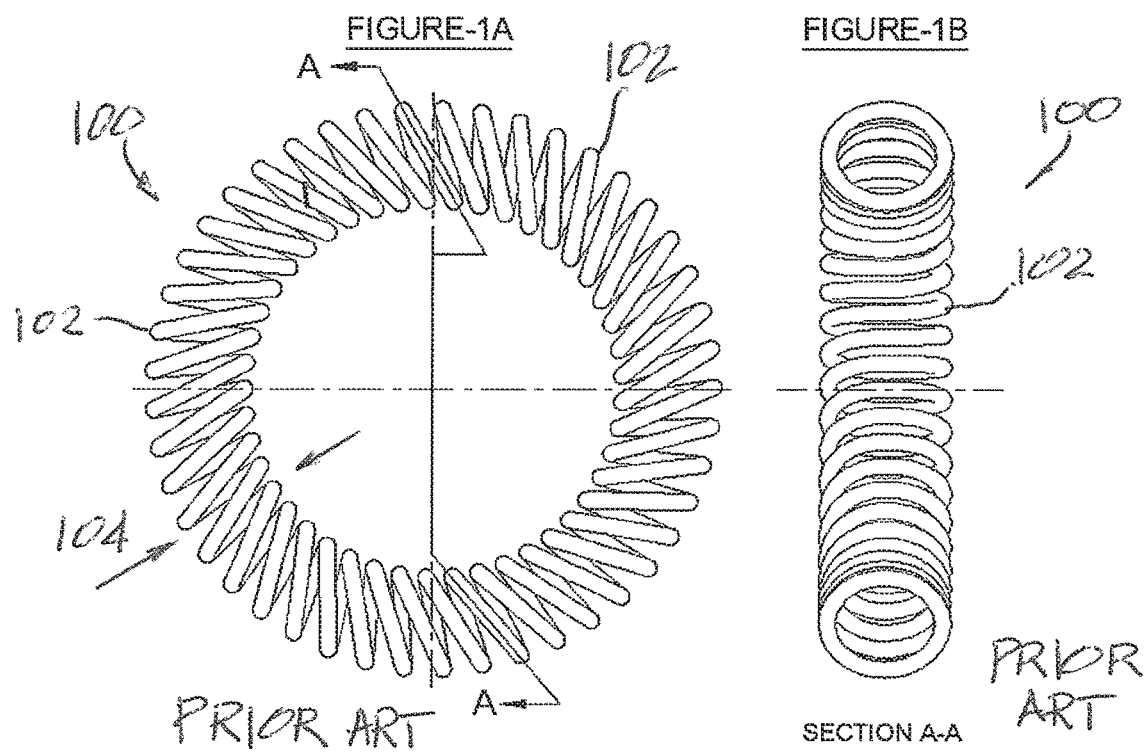
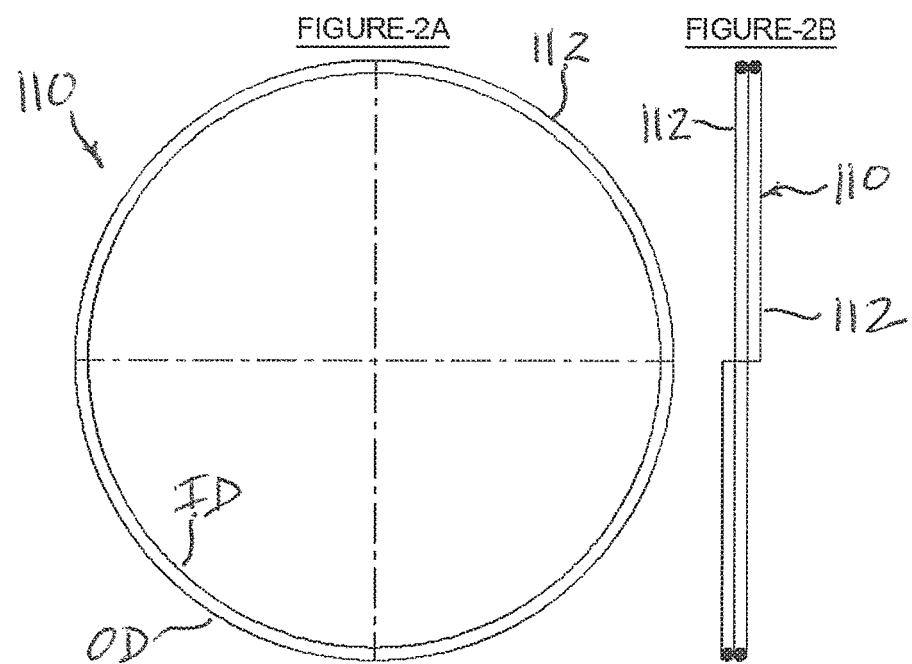

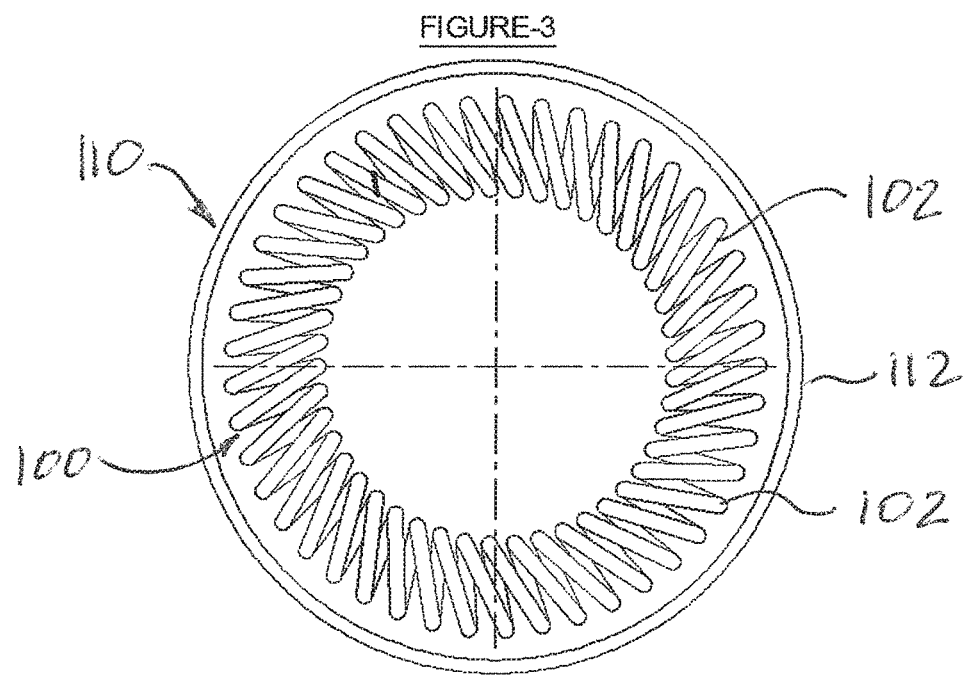
FIGURE-3
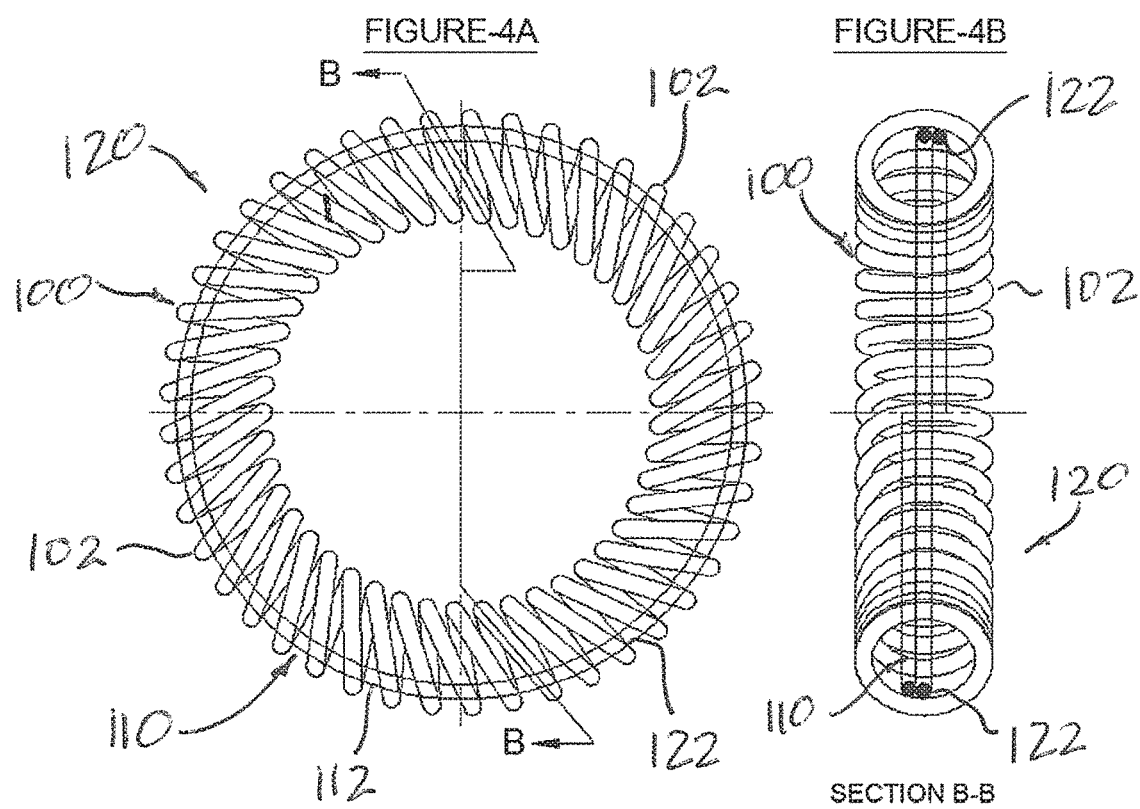
FIGURE-4A
FIGURE-4B
SECTION B-B

FIGURE-5A
FIGURE-5B
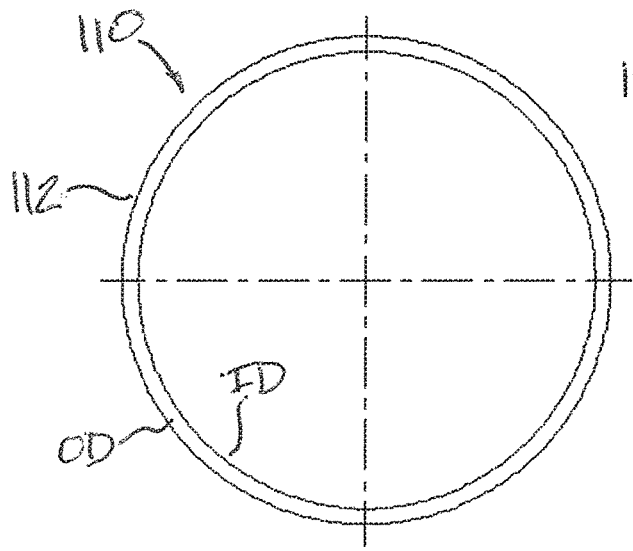
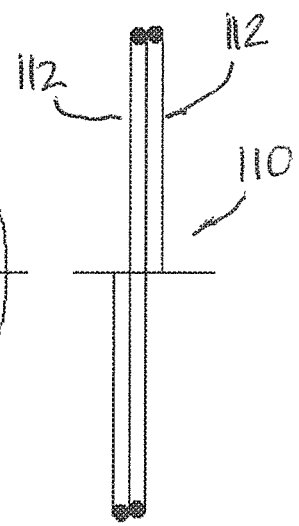
FIGURE-6
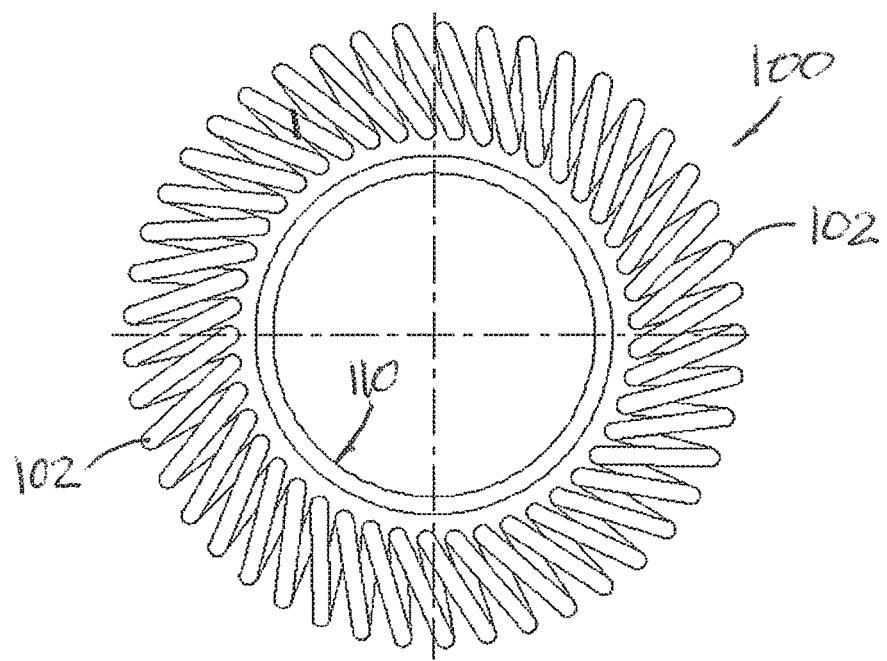

SECTION C-C

SECTION D-D

SECTION E-E

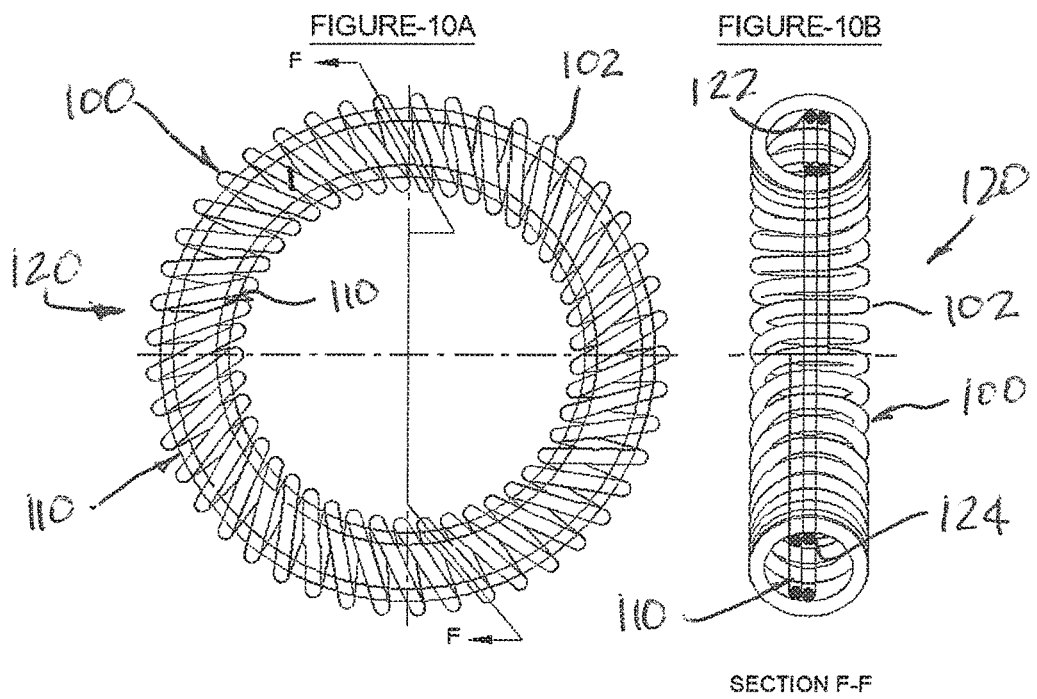
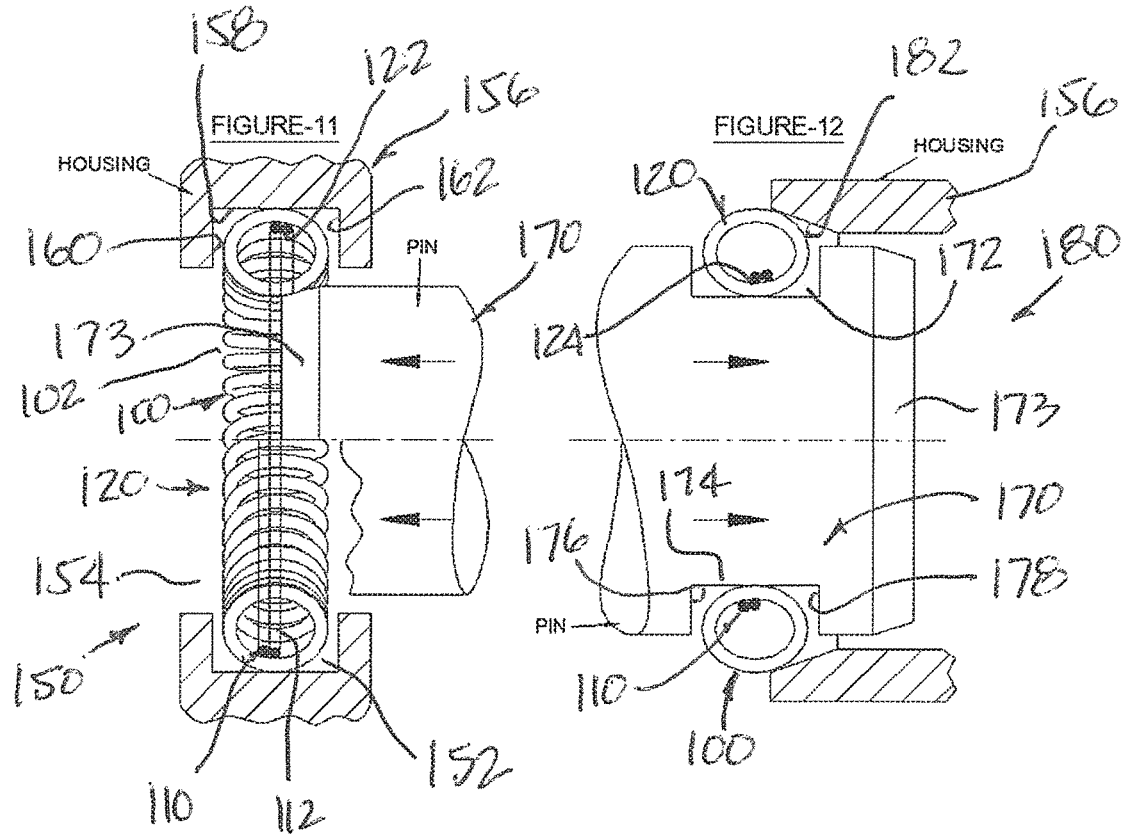

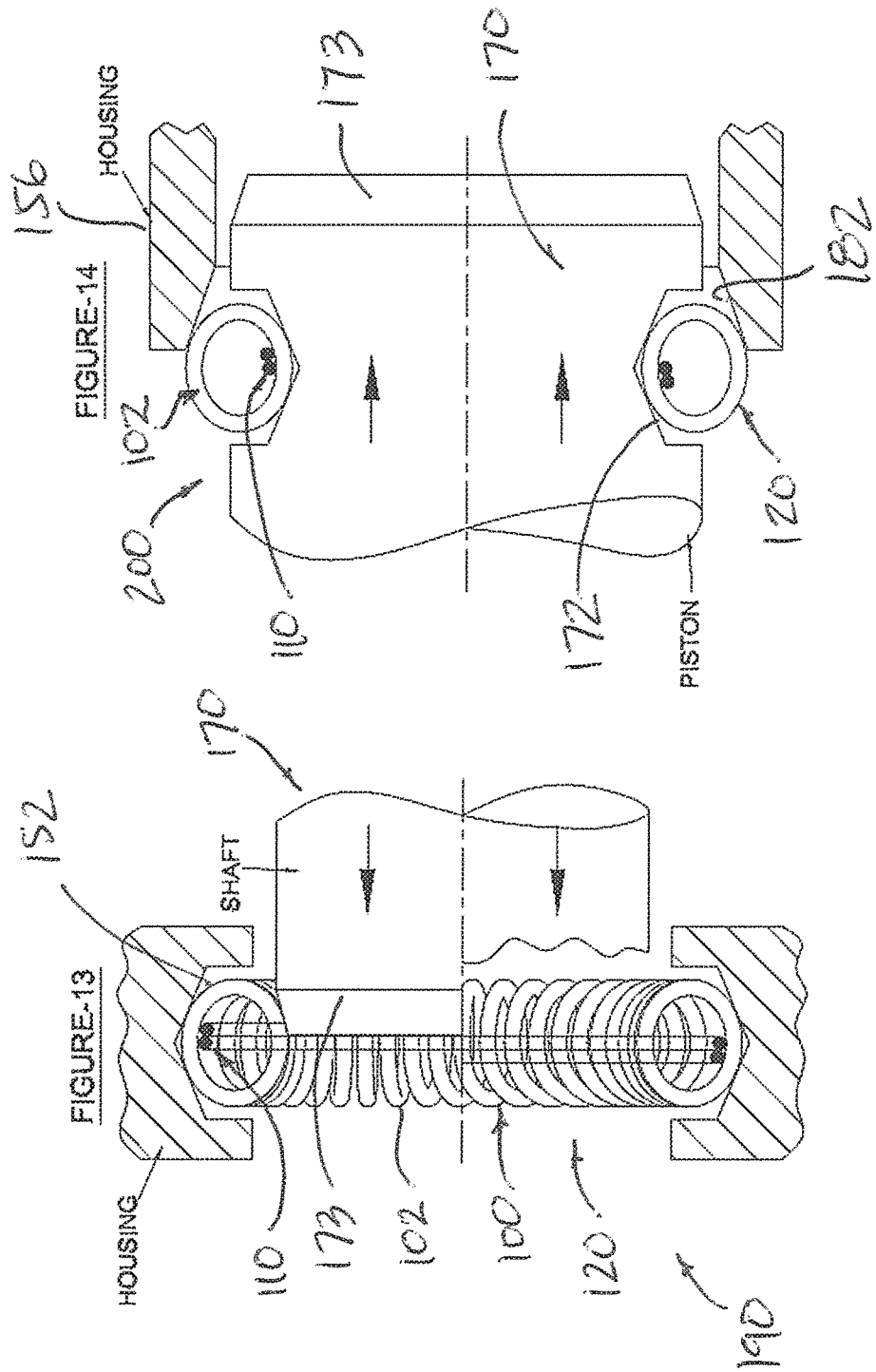

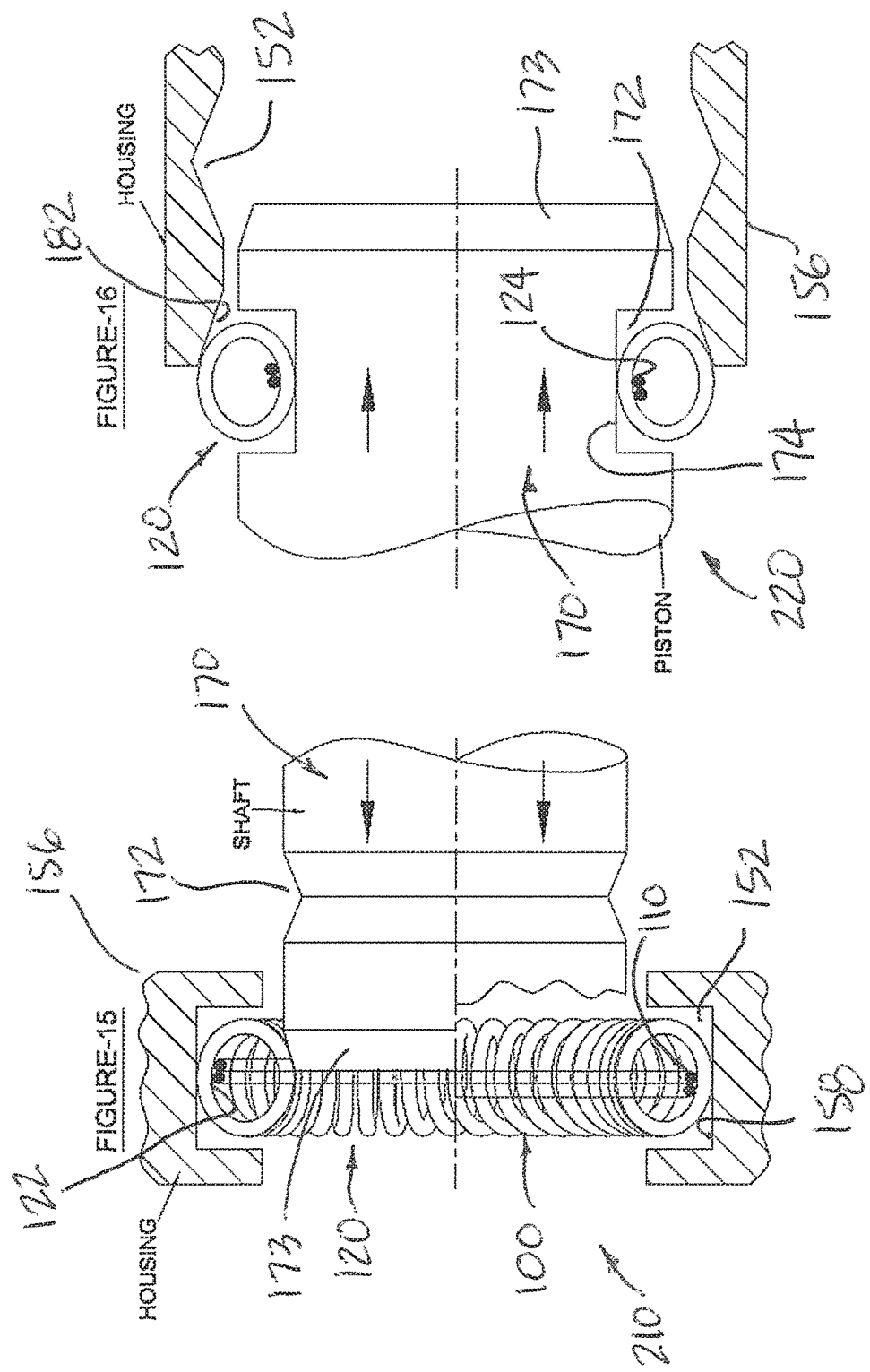

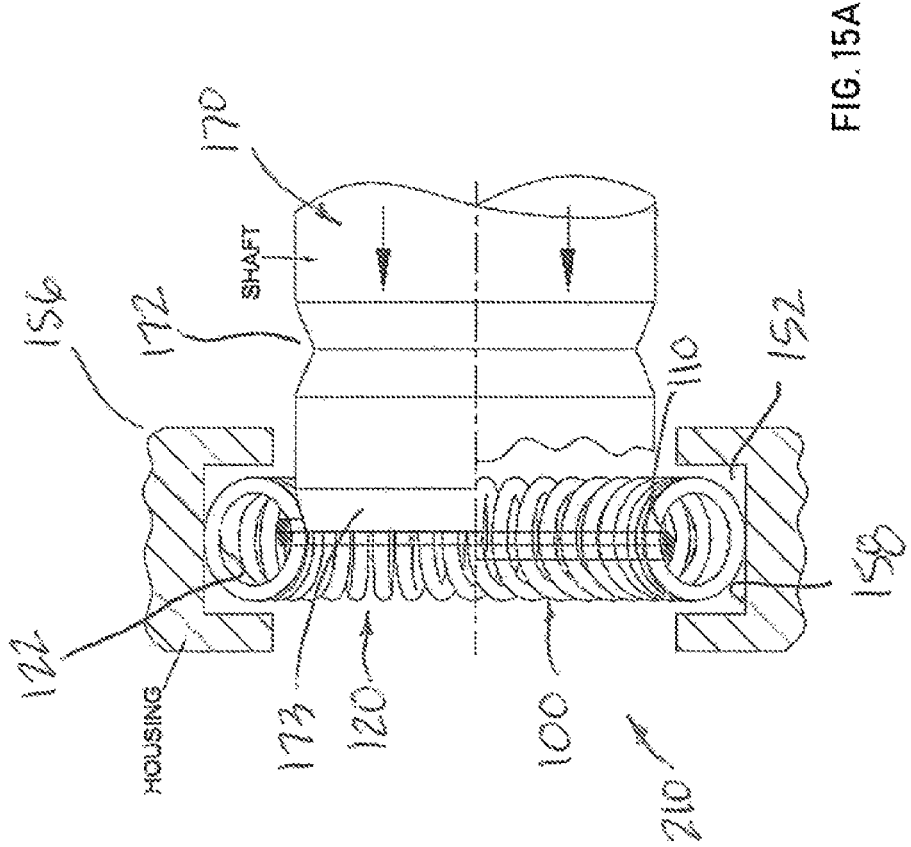

CANTED COIL SPRING WITH LONGITUDINAL COMPONENT WITHIN AND RELATED METHODS

FIELD OF ART

The present invention includes device, system, and method pertaining to coil springs, particularly canted coil springs with longitudinal components, applications of canted coil springs with longitudinal components, and related methods.

BACKGROUND

Canted coil springs are well known and are disclosed in U.S. Pat. Nos. 4,655,462 and 4,826,144, among others. Canted coil springs differ from traditional helical wound springs in that the canted coil springs have coils that cant in the same direction and can cant relative to the lengthwise axis of a length of coil, which is not possible for traditional helical wound springs. Canted coil springs, among other types of coil springs, are used in 15 connectors, commonly pin and housing connectors for holding, latching, or locking purposes. Typically a canted coil spring will be retained in a groove within a housing or in a groove on a pin. In some cases, while the pin is not connected, the spring may come out of the retaining groove due to vibration or impact of the housing.

SUMMARY

The present device, system, and method enhance the ability of a canted coil spring to stay or remain within a spring groove by increasing rigidity of the spring, applying a load against the spring and onto or against the groove surface(s), or providing restriction against the spring taking a shape or size different than that of the retaining groove, which typically happens for the spring to pop or jump out of the groove. In some embodiments, the spring is retained within the spring groove by including a longitudinal component within the canted coil spring. This longitudinal component can be curved and embody different contours, such as annular, square, rectangular and elliptical, to name a few.

The present device, system, and method overcomes the disadvantage of some coil spring pin and housing connectors, in which the coil spring may come out of the coil spring retaining groove when subjected to vibration or impact, by providing a longitudinal component within the coil spring coils in order to increase rigidity of the coil spring, apply a load against the coil spring and onto or against the coil spring retaining groove, or provide restriction against the coil spring taking a shape or size different than that of the coil spring retaining groove.

A further feature of the present disclosure is a coil spring comprising at least one longitudinal member within the coil spring coils that runs generally along the direction of the spring coil axis; wherein the longitudinal member that is within the coil spring is at least half the length of the coil spring.

A still further feature of the present disclosure is a coil spring comprising a longitudinal component within the coil spring coils is at least half the length of the coil spring and runs generally along the direction of the spring coil axis; whereby the longitudinal component provides resistance against the coil spring taking a shape different from that in its natural state or from the shape of the groove.

A yet further feature of the present disclosure is a coil spring comprising a longitudinal component within the coil spring coils that is at least half the length of the coil spring and runs generally along the direction of the spring coil axis; whereby the longitudinal component provides a load against the inside surface of coil spring coils.

Another aspect of the present disclosure is a connector comprising a pin, a housing, and a coil spring; one of the housing or pin comprising a groove to retain the coil spring; the pin to be inserted into the housing to load the spring, providing a spring force to keep the pin and housing connected; the coil spring comprising: a longitudinal component within the coil spring coils that is at least half the length of the coil spring and runs generally along the direction of the spring coil axis; whereby the longitudinal component provides added rigidity to the coil spring.

Yet another aspect of the present disclosure is a connector comprising a pin, a housing, and a coil spring; one of the housing or pin comprising a groove to retain the coil spring; the pin to be inserted into the housing to load the spring, providing a spring force to keep the pin and housing connected; the coil spring comprising: a longitudinal component within the coil spring coils that is at least half the length of the coil spring and runs generally along the direction of the spring coil axis; whereby the longitudinal component provides resistance against the coil spring taking a shape different from that of the groove.

Still yet another feature of the present disclosure is a connector comprising: a pin, a housing, and a coil spring; one of the housing or pin comprising a groove to retain the coil spring; the pin to be inserted into the housing to load the spring, providing a spring force to keep the pin and housing connected; the coil spring comprising: a longitudinal component within the coil spring coils that is at least half the length of the coil spring and runs generally along the direction of the spring coil axis; whereby the longitudinal component provides a load against the inside surface of coil spring coils.

A still further feature of the present disclosure is a coil spring comprising a plurality of spring coils interconnected along a length in a ring configuration and having a spring axis; at least one longitudinal member located within the spring coils that runs generally along the spring axis; wherein the longitudinal member is located within at least half the length of the coil spring.

The coil spring can be a circular ring having two ends that are welded together.

The coil spring can be a canted coil spring.

The coil spring can be a ribbon spring, a helical spring, a radial canted coil spring, or an axial canted coil spring.

The coil spring wherein the longitudinal component can be a metal wire having one or more loops.

The coil spring wherein the longitudinal component can be made from a plastic material.

The coil spring wherein the longitudinal component can be coiled multiple times along the length of the coil spring, such as to form multiple loops.

Another aspect of the present disclosure is a coil spring comprising a plurality of interconnected coils having a length and a spring coil axis; a longitudinal component located within the interconnected coils having a length that is at least half the length of the plurality of interconnected coils and runs generally along the direction of the spring coil axis; whereby the longitudinal component provides resistance against an interior inner surface of the interconnected coils or an interior outer surface of the interconnected coils.

The coil spring can be located in a pin groove or a housing groove of a connector.

The coil spring wherein the longitudinal component can be coiled into a circular loop or a non-circular loop.

The coil spring can have variations as discussed elsewhere herein.

A connector comprising a pin, a housing, and a coil spring; a groove in or on one of the housing or the pin and having the coil spring located therein; the pin is insertable into the housing to load the spring between the pin and the housing and provide a spring force to keep the pin and housing connected; the coil spring comprising: a plurality of interconnected coils having a longitudinal component within the interconnected coils and runs generally along a direction of a spring coil axis; whereby the longitudinal component provides added rigidity to the coil spring.

The connector wherein the coil spring can be a circular ring.

The connector wherein the coil spring can be a canted coil spring.

The connector wherein the coil spring can be a ribbon spring or helical spring.

The connector according wherein the longitudinal component can be a metal wire.

The connector wherein the longitudinal component can be made from a plastic material.

The connector wherein the longitudinal component can be coiled multiple times along a length of the coil spring.

The connector wherein the longitudinal component can be coiled into a non-circular loop or a circular loop.

A yet further feature of the present disclosure is a method of using a connector comprising: providing a pin; providing a housing with a bore, inserting the pin into the bore to trap a coil spring in a groove of one of the housing or the pin; the coil spring comprising: a longitudinal component positioned within a plurality of interconnected coils and runs generally along a direction of the spring coil axis; whereby the longitudinal component provides a load against an interior inner surface of the plurality of interconnected coils or an interior outer surface of the plurality of interconnected coils.

The method wherein the coil spring can be a circular ring.

The method wherein the coil spring can be a canted coil spring.

The method wherein the coil spring can be a ribbon spring or helical spring.

The method wherein the longitudinal component can be a metal wire.

The method wherein the longitudinal component can be a metal wire with different shapes, such as round, square, oval, elliptical, and star shape.

The method wherein the longitudinal component can be coiled into a round shape, a square shape, a rectangular shape, or an elliptical shape.

The method wherein the longitudinal component can have a larger outer dimension than the coil spring outer diameter.

The method wherein the longitudinal component can have a smaller inner dimension than the coil spring inner diameter.

BRIEF DESCRIPTION OF THE DRAWINGS

These and other features and advantages of the present device, system, and method will become appreciated as the same becomes better understood with reference to the specification, claims and appended drawings wherein:

FIGS. 1A and 1B show a typical canted coil spring in side and cross sectional views.

FIGS. 2A and 2B show a longitudinal component in side and cross sectional views to be inserted into a coil spring.

FIG. 3 shows a longitudinal component sized larger than a canted coil spring.

FIGS. 4A and 4B show a longitudinal component inside the canted coil spring in side and cross sectional views.

FIGS. 5A and 5B show a longitudinal component to be inserted into a coil spring in side and cross sectional views.

FIG. 6 shows a longitudinal component sized smaller than a canted coil spring.

FIGS. 10A and 10B show two longitudinal components inside the canted coil spring in side and cross sectional views.

FIG. 11 shows a connector with a canted coil spring with a longitudinal component within retained in a groove in the housing.

FIG. 12 shows a connector with a canted coil spring with a longitudinal component within retained in a groove on the pin.

FIG. 13 shows a connector with a canted coil spring with a longitudinal component within retained in a groove of the housing provided in accordance with further aspects of the present disclosure.

FIG. 14 shows a connector with a canted coil spring with a longitudinal component within retained in a groove on the pin provided in accordance with further aspects of the present disclosure.

FIG. 15 shows an alternative connector with a canted coil spring with a longitudinal component within retained in a groove of the housing for use with a pin having a pin groove provided in accordance with further aspects of the present disclosure.

FIG. 16 shows another alternative connector with a canted coil spring with a longitudinal component within retained in a groove on the pin for use with a housing having a housing groove provided in accordance with further aspects of the present disclosure.

DETAILED DESCRIPTION

Figures 7A, 7B:
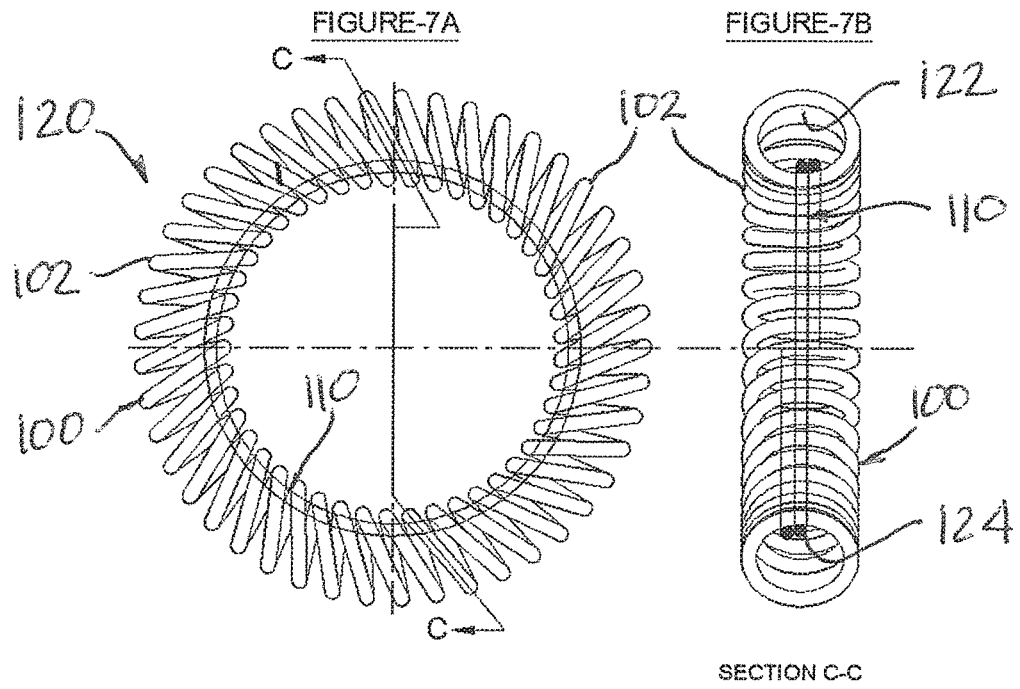
FIGS. 7A and 7B show a longitudinal component inside the canted coil spring in side and cross sectional views.

The detailed description set forth below in connection with the appended drawings is intended as a description of the presently preferred embodiments of canted coil springs with a longitudinal component located within provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

FIGS. 1A and 1B show a typical canted coil spring 100 and a cross sectional view thereof, respectively. The canted coil spring 100 comprises a plurality of coils 102 all canted along a canting direction relative to the spring centerline or spring coil axis. This allows the spring to be squeezed along the radial direction 104 for a radial canted coil spring or along an axial direction, which is orthogonal to the radial direction, for an axial canted coil spring. The wire used to form the spring may be a single metal wire. In other examples, the wire may be a multi-metallic wire, such as having a core of one metallic material an outer layer of another metallic material. Additional layers are also possible. The wire can also be a hollow wire and can have a single metal or be a multi-metallic wire with a hollow center.

FIGS. 2A and 2B show a longitudinal component 110 to be inserted into a canted coil spring, such as the canted coil spring of FIGS. 1A and 1B. As shown, the longitudinal component 110 is a wire that has been coiled into a round or generally round loop 112. However, the loop can be formed with different shapes or configurations, such as a square loop, a rectangular loop, an elliptical loop, or a polygonal shaped loop. A shaped loop, when positioned within the coils 102 of the spring coil, can force the spring to take on the shape of the loop, depending on the relative rigidity of the spring and the longitudinal component. The longitudinal component can be made from a spring material, which is typically metal, or from a plastic. FIG. 2B, in cross-section, shows two back-to-back loops 112 formed from the longitudinal component 110, which has a first free end and a second free end. The free ends allow the one or more loops to compress and expand. The free ends also allow the longitudinal member to be manipulated to fit inside the coils. The loop 112 formed from the longitudinal member 110 has an inside dimension (ID) and an outside dimension (OD) that are both larger than the outside diameter of the spring ring 100 of FIG. 1A, as further discussed below. In some examples, the loop 112 has an ID that is smaller than the outside diameter of the spring ring of FIG. 1A but larger than the inside diameter of the spring ring. In yet other examples, the loop 112 has an ID that is smaller than the inside diameter of the spring ring of FIG. 1A.

FIG. 3 shows a longitudinal component 110 sized larger than a canted coil spring 100. Due to the larger size of the longitudinal component 110, when inserted into the canted coil spring 100, the longitudinal component will provide a load against the inside surface of the canted coil spring coils 102.

FIG. 4A shows a longitudinal component 110 located inside a canted coil spring 100 to form a supporting or reinforced canted coil spring 120 and FIG. 4B shows a cross section of the reinforced canted coil spring 120 of FIG. 4A taken along line B-B. The longitudinal component 110 may be made or coiled from a spring material that has been compressed to a smaller size in order to fit into the canted coil spring, thus providing a load against the interior outer surface 122 of the canted coil spring coils 102 in an outwardly radial direction. The longitudinal component 110 may also be rigid and sized to fit within the canted coil spring without providing a spring load against the inside surfaces of the canted coil spring coils by sizing the OD to be approximately the same as the dimension or diameter of the interior outer surface 122. In other examples, the OD may be smaller than the dimension or diameter of the interior outer surface 122. By introducing the longitudinal component 110 inside the spring ring, the spring ring is supported by the constraint of the one or more loops 112. This in turn provides increased rigidity of the canted coil spring 100 when the canted coil spring is subjected to deflection or change in shape or size. Thus, an aspect of the present disclosure is understood to include a canted coil spring having a plurality of canted coils that is supported from inside the coils. The support can increase the rigidity of the canted coil spring to resist a change in shape. Note that other non-canted coil spring types, such as a ribbon spring and a standard helical spring, can also deflect or change in shape. As such, the present longitudinal member 110 can also be positioned inside the non-canted coil spring types to reinforce the non-canted coil spring types. This addition helps to increase the rigidity of the non-canted coil spring types and resists deflection or change in shape or size of the non-canted coil spring types.

FIG. 4B shows the two loops 112 of the longitudinal component 110 acting on the interior outer surface 122 of each coil 102. If the canted coil spring 100 is a radial canted coil spring, then the longitudinal component 110 is acting on the interior minor axis of each coil to load against the inside surface of each coil.

Thus, an aspect of the present disclosure is understood to include a reinforced spring comprising a longitudinal component 110 located or positioned inside the coils of a canted coil spring. The spring can also be a non-canted coil type having the longitudinal component located inside or within the coils thereof. A further aspect of the present disclosure is a method for forming a canted coil spring, forming a longitudinal component 110 comprising two free ends and having at least one loop, and placing the loop inside the spring coils. Similar to a keychain ring, a first free end of the longitudinal component 110 can be separated and placed inside the coils. The longitudinal component 110 is then rotated around the spring coil until the longitudinal component 110 is completely inside the spring coils. Depending on the number of loops formed with the longitudinal component 110, multiple rotations may be required to thread the longitudinal component through the coils before the longitudinal component 110 is situated inside the coils.

FIGS. 5A and 5B show a longitudinal component 110 to be inserted into a coil spring. As shown, the longitudinal component is a wire that has been coiled into one or more loops 112. The length of wire used to coil the longitudinal component 110 could also be a length of wire which may or may not have spring characteristics. For example, the wire can be relatively hard with low elasticity to provide a rigid frame for the coils but not biasing or spring force for the coils. Additionally, the longitudinal component 110 can be made from a spring material or from plastic. Exemplary plastic materials can include polycarbonate (PC), polyvinyl chloride (PVC), polyetheretherketone (PEEK), nylon 6, acrylonitrile butadiene styrene (ABS), and polyetherketone (PEK), to name a few.

FIG. 6 shows a longitudinal component 110 sized smaller than a canted coil spring 100. That is, in the present embodiment, the ID and the OD of the longitudinal component 110 in the loop configuration is smaller than the inside diameter of the spring 100 that it is placed into. Due to the smaller size of the longitudinal component 110, when inserted into the canted coil spring 100, the longitudinal component 110 will provide a load against the inside surface of the canted coil spring coils. Similar loading will be experienced by non-canted coil spring types, such as ribbon springs and helical springs.

FIG. 7A shows a longitudinal component 110 inside the canted coil spring 100 forming a reinforced canted coil spring 120. FIG. 7B shows a cross section of the reinforced canted coil spring 120 of FIG. 7A taken along line C-C. The longitudinal component 110 may be a spring material that has been stretched to a larger size in order to fit into the canted coil spring 100, thus providing a load against the interior inner surface 124 of the canted coil spring coils 102 in an inward radial direction. In some examples, the longitudinal component 110 may be rigid and sized to fit within the canted coil spring without providing a spring load against the inside surfaces 124 of the canted coil spring coils by sizing the relative dimensions appropriately. The longitudinal component 110 is configured to provide increased rigidity to the canted coil spring 100 when the canted coil spring is subjected to deflection or change in shape or size.

Figures 8A, 8B:
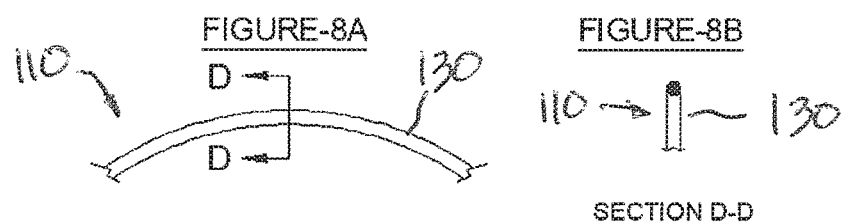
FIGS. 8A and 8B show a section of a longitudinal component in side and cross sectional views.

FIG. 8A shows a section of a longitudinal component 110 and FIG. 8B shows a cross section taken along line D-D of FIG. 8A. As shown, the longitudinal component 110 is a wire 130 having a bend or an arcuate section. In some instances, the longitudinal component 110 can have multiple bend sections, such as two or more bend sections, resembling a snake with two ends spaced from one another.

Figures 9A, 9B:
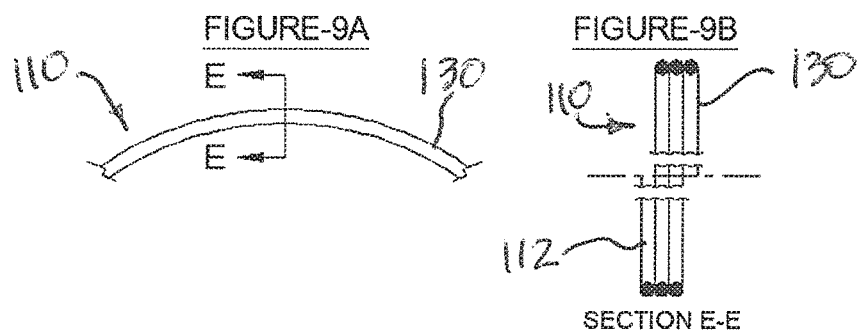
FIGS. 9A and 9B show a section of a longitudinal component in side and cross sectional views.

FIG. 9A shows a section of a longitudinal component 110 and FIG. 9B shows a cross section taken along line E-E of FIG. 9A. The longitudinal component 110 is a wire 130 that has been coiled multiple times to form multiple loops 112. As shown, there are three loops 112. In other examples, there can be a single loop, two loops, or more than three loops. The multiple coil sections may provide increased spring force or rigidity to the longitudinal component 110.

FIG. 10A shows two longitudinal components 110 inside the canted coil spring 100 and FIG. 10B shows a cross section taken along line F-F of FIG. 10A. The longitudinal components 110 may be a spring material that has been compressed to a smaller size and another stretched to a larger size in order to fit into the canted coil spring to form a reinforced canted coil spring 120. As shown, one of the longitudinal components 110 is pressed against the interior outer surface 122 of the coils and the other longitudinal component 110 is pressed against the interior inner surface 124 of the coils. The longitudinal components 110 provide loads against the interior inside surface 124 and the interior outer surface 122 of the canted coil spring coils in outward and inward radial directions. The longitudinal components may also be rigid and sized to fit within the canted coil spring without providing a spring load against the inside surfaces of the canted coil spring coils. The longitudinal components 110 are configured to provide increased rigidity of the canted coil spring 100 when the canted coil spring is subjected to deflection or change in shape or size.

Thus, an aspect of the present disclosure is understood to include two longitudinal components 110 of two different sizes positioned within the coils of the coil spring to reinforce the coil spring. In one example, one of the longitudinal components 110 loads against the interior inner surface 124 of the coils and the other longitudinal component 110 loads against the inner outer surface 122 of the coils. In other examples, only the interior inner surface or the interior outer surface is loaded but not both. In still other examples, two longitudinal components 110 are placed inside the coils of the spring coil but neither longitudinal component 110 loads the coils. Aspects of the present disclosure are further understood to include a method for placing one or more longitudinal components 110 inside the coils of a spring coil corresponding to the disclosed apparatus.

Another feature of the present disclosure is understood to include a canted coil spring having a generally constant force over a working deflection range that has been modified by a longitudinal component 110. As described in FIG. 3 of U.S. Pat. No. 4,655,462, the contents of which are expressly incorporated herein by reference, canted coil springs can deflect in a direction normal to the spring centerline and such deflection has a characteristic that can be described as having a generally constant force over a working deflection range. With the addition of one or more longitudinal components 110 as described herein, the deflection characteristics of the canted coil spring are modified by the deflection characteristics of the one or more longitudinal components. Further, a longitudinal component can be sized to not interfere with the coils when they deflect within a normal deflection range.

FIG. 11 shows a connector assembly 150 with a canted coil spring 100 with a longitudinal component 110, i.e., a reinforced canted coil spring 120, within retained in a groove 152 inside a bore 154 of the housing 156. The longitudinal component 110 may have two loops 112, as shown, or may have more or less than two loops. The groove 152 comprises a groove bottom surface 158 located between two sidewalls 160, 162. The bottom surface 158 may be generally parallel to a lengthwise axis of the housing and/or the pin, and the two sidewalls 160, 162 may be general parallel to one another or may diverge or converge relative to one another, such as having a V-configuration or a reverse V-configuration with a subtended bottom surface 158. In other examples, the housing 156 has a V-groove without a subtended bottom surface. The spring may simultaneously contact all three surfaces 158, 160, 162 of the groove or just the bottom surface 158 as shown. If the housing has a V-groove, the spring can simultaneously contact both tapered surfaces of the V-groove. The longitudinal component 110 may be a spring material that has been compressed to a smaller size in order to fit into the canted coil spring 110, thus providing a load against the interior outer surface 122 of the canted coil spring coils 102 in an outwardly radial direction. The longitudinal component 110 loads and pins the canted coil spring coils against the groove bottom 158, aiding in retention of the canted coil spring in the groove.

To remove the reinforced spring 120 from the housing groove 152, the canted coil spring 100 as well as the longitudinal component 110 must compress to fit through the bore inside diameter of the housing 156. Thus, an aspect of the present disclosure is the ability of the spring to resist dislodgement from the groove by reinforcing the coils. As shown, the force required to dislodge the spring is the force to compress the spring 100 and the force to compress the longitudinal component 110. Thus, the reinforced canted coil spring 120 is less likely to be ejected or removed from the groove 152 than traditional non-reinforced canted coil springs.

The longitudinal component 110 may also be rigid and sized to fit within the canted coil spring without providing a spring load against the inside surfaces of the canted coil spring coils. The longitudinal component 110 is configured to provide increased rigidity of the canted coil spring when the canted coil spring is subjected to deflection or change in shape or size. However, since the coils are supported along the interior outer surface 122 only, the inside diameter of the spring can expand to accommodate the pin 170, which has a tapered insertion end 173, without significant resistance than with ordinary canted coil springs. Since significant canted coil spring deflection or change in shape is required for the canted coil spring to come out of the groove, the longitudinal component 110 helps retain the canted coil spring in the groove 263.

Although the pin is shown without a pin groove and the application is a holding application, one can be incorporated. The pin groove can have a V-groove configuration or a groove bottom with two sidewalls. The housing groove 152 and the pin groove can latch together with the spring in between or depending on the shapes of the two grooves can lock to one another with the spring therebetween.

The connector can be a mechanical connector, an EMI shielding connector, or an electrical connector capable of transmitting electricity or current through the spring coils. For example, the housing may be connected to a source or node and the pin connected to another source or node and electricity or current transfer between the two nodes through the spring coil. For an electrical connector application, the housing, the pin, the spring, and optionally the reinforcing member are made from electrically conductive material or from different electrically conductive materials.

FIG. 12 shows a connector 180 comprising a housing 156 and a pin 170 with a canted coil spring 100 with a longitudinal component 110, i.e., a reinforced canted coil spring 120, within and retained in a groove 172 in the pin. The pin comprises a tapered insertion end 173 and a groove comprising a groove bottom 174 and two sidewalls 176, 178. The bottom surface 174 may be generally parallel to a lengthwise axis of the pin and the two sidewalls 160, 162 may be general parallel to one another or may diverge or converge relative to one another, such as having a V-configuration or a reverse V-configuration with a subtended bottom surface 174. In other examples, the pin 170 has a V-groove without a subtended bottom surface. The spring may simultaneously contact all three surfaces 174, 176, 178 of the pin groove 172 or just the bottom surface 174 as shown. If the pin has a V-groove, the spring can simultaneously contact both tapered surfaces of the V-groove.

The housing 156 is shown without a housing groove and the connector is a holding connector. In other examples, the housing has a housing groove as described in FIG. 11. As shown, the housing has a tapered inlet end 182 to facilitate with compressing the spring upon insertion of the pin. If the housing has a housing groove, then the connector may be understood to be a latching connector that permits separation of the pin from the housing or a locking connector that does not permit separation of the pin from the housing.

The longitudinal component 110 may be a spring material that has been stretched to a larger size in order to fit into the canted coil spring 100. As shown, the longitudinal component 110 provides a load against the interior inside surface 124 of the canted coil spring coils 102 in an inward radial direction. The longitudinal component 110 loads and pins the canted coil spring coils against the groove bottom 174, aiding in retention of the canted coil spring 100 in the groove 172.

The longitudinal component 110 may also be rigid and sized to fit within the canted coil spring without providing a spring load against the inside surfaces of the canted coil spring coils. The longitudinal component 110 is configured to provide increased rigidity of the canted coil spring 100 when the canted coil spring is subjected to deflection or change in shape or size. Since significant canted coil spring deflection or change in shape or size is required for the canted coil spring to come out of the groove, the longitudinal component helps retain the canted coil spring in the groove.

Thus, an aspect of the present disclosure is understood to include a connector comprising a groove located on the pin or in a bore of the housing. If the groove is located in the housing, then a spring 100 located in the groove has a longitudinal component 110, i.e., a reinforced canted coil spring 120, that presses against the interior outer surface 122 of the coils 102. If the groove is located on the pin, then the spring 100 located in the groove has a longitudinal component 110, i.e., a reinforced canted coil spring 120, that presses against the interior inner surface 124 of the coils 102. In some examples, the canted coil spring 100 has two longitudinal components 110 and wherein one of the two longitudinal components presses against the interior inner surface 124 of the coils 102 and the other of the two longitudinal components presses against the interior outer surface 122 of the coils 102.

FIG. 13 shows a connector 190 provided in accordance with further aspects of the present disclosure. The present connector 190 is similar to the connector 150 of FIG. 11 with the exception of the housing groove 152, which is shown with a V-bottom and two generally parallel sidewalls. The reinforced spring 120, which is a combination of a canted coil spring 100 and a longitudinal member 110, is also spaced from the two sidewalls and touches both tapered surfaces of the V-bottom. The pin 170 is shown without a pin groove but optionally may include one, as described with reference to FIG. 12. In other examples, the housing groove 152 is a V-groove without sidewalls or a V-groove without sidewalls with a subtended bottom wall in between the two tapered surfaces.

FIG. 14 shows a connector 200 provided in accordance with further aspects of the present disclosure. The present connector 200 is similar to the connector 180 of FIG. 12 with the exception of the pin groove 172, which is shown with a V-bottom and two generally parallel sidewalls. The reinforced spring 120, which is a combination of a canted coil spring 100 and a longitudinal member 110, is also spaced from the two sidewalls and touches both tapered surfaces of the V-bottom. The housing 156 is shown without a housing groove but optionally may include one, as described with reference to FIG. 11.

FIG. 15 shows a connector 210 provided in accordance with further aspects of the present disclosure. The present connector 210 comprises a housing 156 with a housing groove 152, a pin 170 with a pin groove 172, and a reinforced spring 120 positioned in the housing groove. As shown, the reinforced spring 120 has a canted coil spring with a longitudinal member 110 positioned inside the coils 102 and loaded against the interior outside surface 122 of the coils. In other examples, a second longitudinal member 110 is situated inside the coils and loaded against the interior inner surface of the coils. The reinforced spring 120 is also spaced from the two sidewalls of the housing groove 152 but touches the bottom surface 158 of the housing groove. In other examples, the housing groove may have a different groove configuration. For example, the housing groove can have a V-shape configuration, a V-shape bottom with two sidewalls, a V-shape groove with a subtended bottom surface, or any of the various housing groove configurations shown in pending U.S. application Ser. No. 13/843,018, published as No. 2014/0030018, the contents of which are expressly incorporated herein by reference. Any of the alternative housing groove configurations may interact with a pin having a pin groove or without a pin groove.

The pin 170 shown with the connector 210 of FIG. 15 comprises a tapered insertion end 173 and a pin groove 172, which is shown with a V-shape configuration. In other examples, the pin groove 172 has a different groove configuration, such as a bottom wall with two generally parallel sidewalls, a V-bottom with two sidewalls, or any of the various pin groove configurations shown in pending U.S. application Ser. No. 13/843,018. Any of the alternative pin groove configurations may interact with a housing having a housing groove or without a housing groove.

As shown, the pin 170 is connectable to the housing 156, or vice-versa, by inserting the pin in through the spring opening until the spring 120 is captured by a common groove defined by the housing groove 152 and the pin groove 172. When captured, the spring is loaded by both the housing groove and the pin groove. In other words, the pin groove and the housing groove both apply a load to compress the spring therebetween. This is understood to mean that the spring has a relatively larger dimension than the space provided between the two grooves and as a result is compressed therebetween.

FIG. 16 shows a connector 220 provided in accordance with further aspects of the present disclosure. The present connector 220 comprises a housing 156 with a housing groove 152, a pin 170 with a pin groove 172, and a reinforced spring 120 positioned in the pin groove. As shown, the reinforced spring 120 has a canted coil spring with a longitudinal member 110 positioned inside the coils 102 and loaded against the interior inside surface 124 of the coils. In other examples, a second longitudinal member 110 is situated inside the coils and loaded against the interior outside surface of the coils. The reinforced spring 120 is also spaced from the two sidewalls of the pin groove 172 but touches the bottom surface 174 of the pin groove. In other examples, the pin groove 172 may have a different groove configuration. For example, the pin groove can have a V-shape configuration, a V-shape bottom with two sidewalls, a V-shape groove with a subtended bottom surface, or any of the various pin groove configurations shown in pending U.S. application Ser. No. 13/843,018, published as No. 2014/0030018, the contents of which are expressly incorporated herein by reference.

The housing 156 shown with the connector 220 of FIG. 16 comprises a tapered insertion end 182 and a housing groove 152, which is shown with a V-shape configuration. In other examples, the pin groove 152 has a different groove configuration, such as a bottom wall with two generally parallel sidewalls, a V-bottom with two sidewalls, or any of the various pin groove configurations shown in pending U.S. application Ser. No. 13/843,018.

As shown, the pin 170 is connectable to the housing 156, or vice-versa, by inserting the pin in through the spring opening until the spring 120 is captured by a common groove defined by the housing groove 152 and the pin groove 172. When captured, the spring is loaded by both the housing groove and the pin groove. In other words, the pin groove and the housing groove both apply a load to compress the spring therebetween. This is understood to mean that the spring has a relatively larger dimension than the space provided between the two grooves and as a result is compressed therebetween.

The connectors discussed herein may be used for EMI shielding, for latching or locking, for holding, or for electrical transmission. For electrical applications, the spring 120, housing and pin are made from a conductive material and can vary in type. For example, the spring may be made from copper or copper alloys while the housing and the pin from a high tensile strength material with optional cladding layer or layers. Also, while the wire used for the longitudinal member is shown as being round, other shapes may be possible, such as oval, square, elliptical, partially round, or star shape wire. The wire used for the longitudinal member can also be non-metallic, such as polycarbonate, PEEK, PA, and PVC. Further, non-canted coil spring type may be used with the disclosed connectors.

Figure 17:
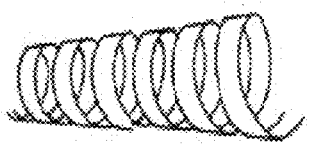
FIG. 17 shows a section of a ribbon spring.

FIG. 17 shows a section of a ribbon spring that can be used as the coil spring of the present disclosure with a longitudinal member.

Figure 18:
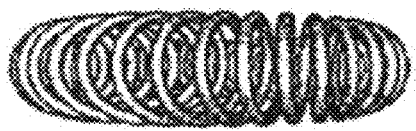
FIG. 18 shows an axial canted coil spring.

FIG. 18 shows an axial canted coil spring that can be used as the coil spring of the present disclosure with a longitudinal member.

Figure 19:
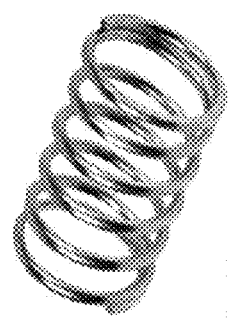
FIG. 19 shows a section of a helical spring.

FIG. 19 shows a section of a helical spring that can be used as the coil spring of the present disclosure with a longitudinal member.

Figure 20:
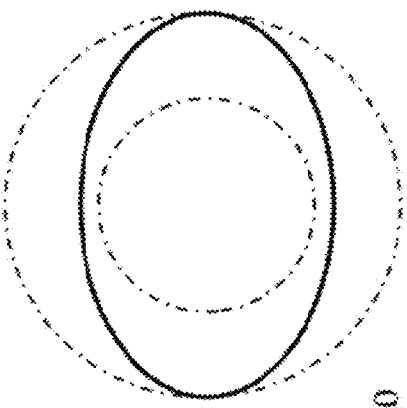
FIG. 20 shows a longitudinal component located inside a canted coil spring, the latter represented in dash-lines. The longitudinal component has a non-circular shape, which is shown in FIG. 20 with an elliptical shape.

FIG. 20 shows a longitudinal component located inside a canted coil spring, the latter represented in dash-lines. The longitudinal component has a non-circular shape, which is shown in FIG. 20 with an elliptical shape.

Figure 21:
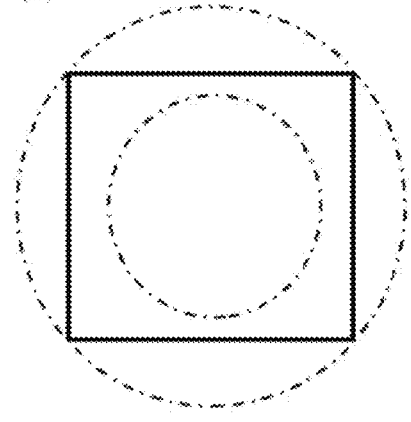
FIG. 21 shows a longitudinal component located inside a canted coil spring, the latter represented in dash-lines. The longitudinal component has a non-circular shape, which is shown in FIG. 21 with a square shape.

FIG. 21 shows a longitudinal component located inside a canted coil spring, the latter represented in dash-lines. The longitudinal component has a non-circular shape, which is shown in FIG. 21 with a square shape.

Figure 22:
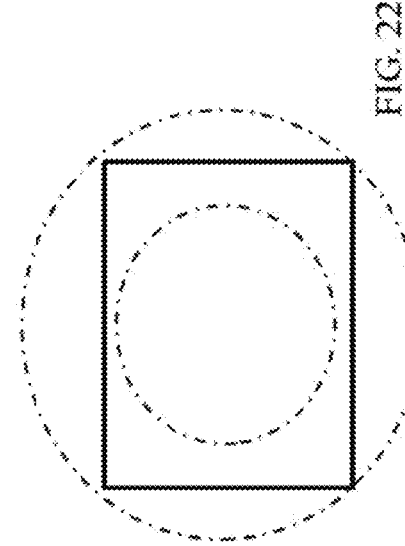
FIG. 22 shows a longitudinal component located inside a canted coil spring, the latter represented in dash-lines. The longitudinal component has a non-circular shape, which is shown in FIG. 22 with a rectangular shape.

FIG. 22 shows a longitudinal component located inside a canted coil spring, the latter represented in dash-lines. The longitudinal component has a non-circular shape, which is shown in FIG. 22 with a rectangular shape.

Although limited embodiments of canted coil spring assemblies and their components have been specifically described and illustrated herein, many modifications and variations will be apparent to those skilled in the art. For example, the various reinforced springs shown with reference to FIGS. 11-16 may incorporate two longitudinal members to press against the interior outer surface and interior inner surface of the coils, may have both a metallic spring and a non-metallic longitudinal member, etc. Furthermore, it is understood and contemplated that features specifically discussed for one spring or connector embodiment may be adopted for inclusion with another spring or connector embodiment, provided the functions are compatible. Accordingly, it is to be understood that the spring assemblies and their components constructed according to principles of the disclosed device, system, and method may be embodied other than as specifically described herein. The disclosure is also defined in the following claims.

What is claimed is:

1. A connector comprising:
   a pin having a body with a length and an insertion end with a tapered nose section;
   a housing comprising a bore sized and shaped to receive the pin, and
   a canted coil spring;
   a groove in or on one of the housing or the pin and having the canted coil spring located therein;
   the pin is located in the bore of the housing and the canted coil spring located in the groove such that the canted coil spring is biased against both the housing and the pin;
   the canted coil spring comprising:
      a plurality of spring coils interconnected along a length in a ring configuration having two ends connected together and having a spring axis through the spring ring and a coil axis through the plurality of coils; said plurality of spring coils are each canted along a same general direction to form a canted coil spring;

a longitudinal component comprising two free ends and having two or more loops located within the plurality of spring coils such that the two or more loops run generally along a direction of the coil axis;

a second longitudinal component having two or more loops located within the plurality of spring coils such that the two or more loops run generally along the coil axis;

wherein the longitudinal component is located within at least half the length of the plurality of spring coils and the two free ends are separable from one another; and wherein an inner surface at an inner diameter of the longitudinal component contacts an inner inside surface of the ring configuration of the canted coil spring.

2. The connector according to claim 1, further comprising a second groove and wherein the canted coil spring is located in the groove and in the second groove.

3. The connector according to claim 1, wherein the groove has a groove bottom with two tapered surfaces.

4. The connector according to claim 3, wherein the longitudinal component is a metal wire.

5. The connector according to claim 1, wherein the longitudinal component is made from a plastic material.

6. The connector according to claim 2, wherein the groove has a groove bottom with two tapered surfaces.

7. The connector according to claim 1, wherein the longitudinal component is coiled into a non-circular loop.

8. The connector according to claim 1, wherein the groove has two sidewalls and a flat bottom wall located therebetween.

9. The connector according to claim 8, further comprising a second groove and wherein the second groove comprises two sidewalls and a flat bottom wall located therebetween.

10. The connector according to claim 1, wherein the two ends are welded together.

11. A method of using a connector comprising:
providing a pin having a body with a length and an insertion end with a tapered nose section;
providing a housing with a bore, said bore being sized and shaped to receive said pin;
inserting the pin into the bore to trap a canted coil spring in a groove and biasing the canted coil spring against the housing and the pin;
the canted coil spring comprising:
a plurality of spring coils interconnected along a length in a ring configuration having two ends connected together and having a spring axis through the spring ring and a coil axis through the plurality of coils; said plurality of spring coils are each canted along a same general direction to form a canted coil spring;
a longitudinal component comprising two free ends and having two or more loops located within the plurality of spring coils such that the two or more loops run generally along a direction of the coil axis;
a second longitudinal component having two or more loops located within the plurality of spring coils such that the two or more loops run generally along the coil axis;
wherein the longitudinal component is located within at least half the length of the plurality of spring coils and the two free ends are separable from one another; and
wherein an inner surface at an inner diameter of the longitudinal component contacts an inner inside surface of the ring configuration of the canted coil spring.

12. The method according to claim 11, wherein the longitudinal component is a metal wire.

13. The method according to claim 11, wherein the longitudinal component is coiled into a round shape, a square shape, a rectangular shape, or an elliptical shape.

14. The method according to claim 11, wherein the second longitudinal component is acting on an outer interior surface of the plurality of coils.

15. The method according to claim 11, wherein an inner diameter of the longitudinal component is smaller than an inside diameter of the ring configuration of the canted coil spring prior to placing the longitudinal component inside the plurality of spring coils.

16. The method according to claim 11, further comprising a second groove and the canted coil spring being located in the groove and the second groove.

17. The method according to claim 16, wherein the groove is located with the pin and the second groove is located with the housing and wherein the canted coil spring is located in the groove before insertion of the pin into the bore of the housing.

18. The method according to claim 11, wherein the two ends are welded together.

19. A method of using a connector comprising:
providing a pin having a body with a length and an insertion end with a tapered nose section;
providing a housing with a bore, said bore being sized and shaped to receive said pin;
inserting the pin into the bore to trap a canted coil spring in a groove and biasing the canted coil spring against the housing and the pin;
the canted coil spring comprising:
a plurality of spring coils interconnected along a length in a ring configuration having two ends connected together and having a spring axis through the spring ring and a coil axis through the plurality of coils; said plurality of spring coils are each canted along a same general direction to form a canted coil spring;
a longitudinal component comprising two free ends and having two or more loops located within the plurality of spring coils such that the two or more loops run generally along a direction of the coil axis;
providing a second groove and the canted coil spring being located in the groove and the second groove;
wherein the longitudinal component is located within at least half the length of the plurality of spring coils and the two free ends are separable from one another;
wherein an inner surface at an inner diameter of the longitudinal component contacts an inner inside surface of the ring configuration of the canted coil spring; and
wherein the groove is located with the pin and the second groove is located with the housing and wherein the canted coil spring is located in the second groove before insertion of the pin into the bore of the housing.

* * * * *